(12) United States Patent
Kim et al.

(10) Patent No.: US 9,323,525 B2
(45) Date of Patent: Apr. 26, 2016

(54) MONITORING VECTOR LANE DUTY CYCLE FOR DYNAMIC OPTIMIZATION

(71) Applicant: Intel Corporation, Santa Clara, CA (US)

(72) Inventors: Daehyun Kim, San Jose, CA (US); Jong Soo Park, Santa Clara, CA (US); Dong Hyuk Woo, Campbell, CA (US); Richard M. Yoo, Stanford, CA (US); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/190,404

(22) Filed: Feb. 26, 2014

(65) Prior Publication Data

US 2015/0242210 A1 Aug. 27, 2015

(51) Int. Cl.
*G06F 9/30* (2006.01)
*G06F 11/34* (2006.01)
*G06F 11/30* (2006.01)

(52) U.S. Cl.
CPC ........ *G06F 9/30036* (2013.01); *G06F 11/3024* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |

(Continued)

FOREIGN PATENT DOCUMENTS

EP 1 282 030 A1 5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Corey S Faherty
(74) *Attorney, Agent, or Firm* — Trop, Pruner & Hu, P.C.

(57) ABSTRACT

In an embodiment, a processor includes a vector execution unit having a plurality of lanes to execute operations on vector operands, a performance monitor coupled to the vector execution unit to maintain information regarding an activity level of the lanes, and a control logic coupled to the performance monitor to control power consumption of the vector execution unit based at least in part on the activity level of at least some of the lanes. Other embodiments are described and claimed.

12 Claims, 11 Drawing Sheets

(56) References Cited

U.S. PATENT DOCUMENTS

| | | | |
|---|---|---|---|
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,074,026 B2 | 12/2011 | Kim | |
| 2001/0044909 A1 | 11/2001 | Oh et al. | |
| 2002/0004916 A1* | 1/2002 | Marchand et al. | 713/322 |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0044429 A1* | 2/2005 | Gaskins et al. | 713/300 |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0047349 A1* | 2/2011 | Hayashi | 712/22 |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2015/0019896 A1* | 1/2015 | Anderson et al. | 713/324 |

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/600,568, filed Aug. 31, 2012, entitled, "Configuring Power Management Functionality in a Processor," by Malini K. Bhandaru, et al.

* cited by examiner

MONITORING VECTOR LANE DUTY CYCLE FOR DYNAMIC OPTIMIZATION

FIELD OF INVENTION

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Modern processors are capable of executing instructions of multiple instruction sets. For example, the Intel™ 64-bit instruction set provides multiple vector interfaces to support vector instructions of varying width. From earlier instruction set architecture (ISA) extensions such as so-called Streaming SIMD Extensions (SSE) to current Advanced Vector Extensions (AVX-512), vector width has been increasing, in some cases from 4 to 16 single-precision floating-point numbers, with processors having different vector interfaces to handle these widths. This width variance makes it difficult for a programmer or compiler to choose which interface to use, since the input data distribution (e.g., for a sparse matrix) or the number of loop iterations (e.g., for an auto-vectorized loop) may not be known in advance to enable determination of the most efficient vector width. As a result, poor vector utilization (e.g., wasted power/energy) and/or performance impacts are common problems.

DETAILED DESCRIPTION

In various embodiments, a hardware technique is provided to monitor an activity level, e.g., in the form of a duty cycle of each vector lane of one or more vector execution units of a processor. When this performance information is provided to hardware and/or software, various optimizations may be performed to improve performance and/or to reduce power consumption.

As examples, performance monitoring information may be exposed through a performance monitoring interface to enable software to use this information to dynamically switch between implementations of the same piece of code that use different vector interfaces (e.g., have different vector widths and/or which execute different vector instructions). The same information can also be used by hardware to dynamically control power consumption of one or more vector execution units, e.g., to power down a subset of vector lanes, in cases where a dependency violation does not occur. Using an embodiment of the present invention, dynamic control of vector width of one or more vector execution units may occur, based at least in part on input-dependent control flow.

In an embodiment, certain performance monitoring hardware is used to monitor vector execution unit operation, including vector lane duty cycle information. Software may leverage this duty cycle information to improve vector utilization. In addition, hardware may also leverage this duty cycle information to improve vector utilization. In one embodiment, active vector lanes may be monitored. As one example, a mask register value is used to identify an active vector lane. For vector instructions having implicit mask registers (e.g., an AVX VBLENDV instruction) that use the sign bit of another vector register, the implicit values may be extracted and used. Still other schemes may be used to identify active vector lanes. A hardware monitor then records such information.

Figure 1:
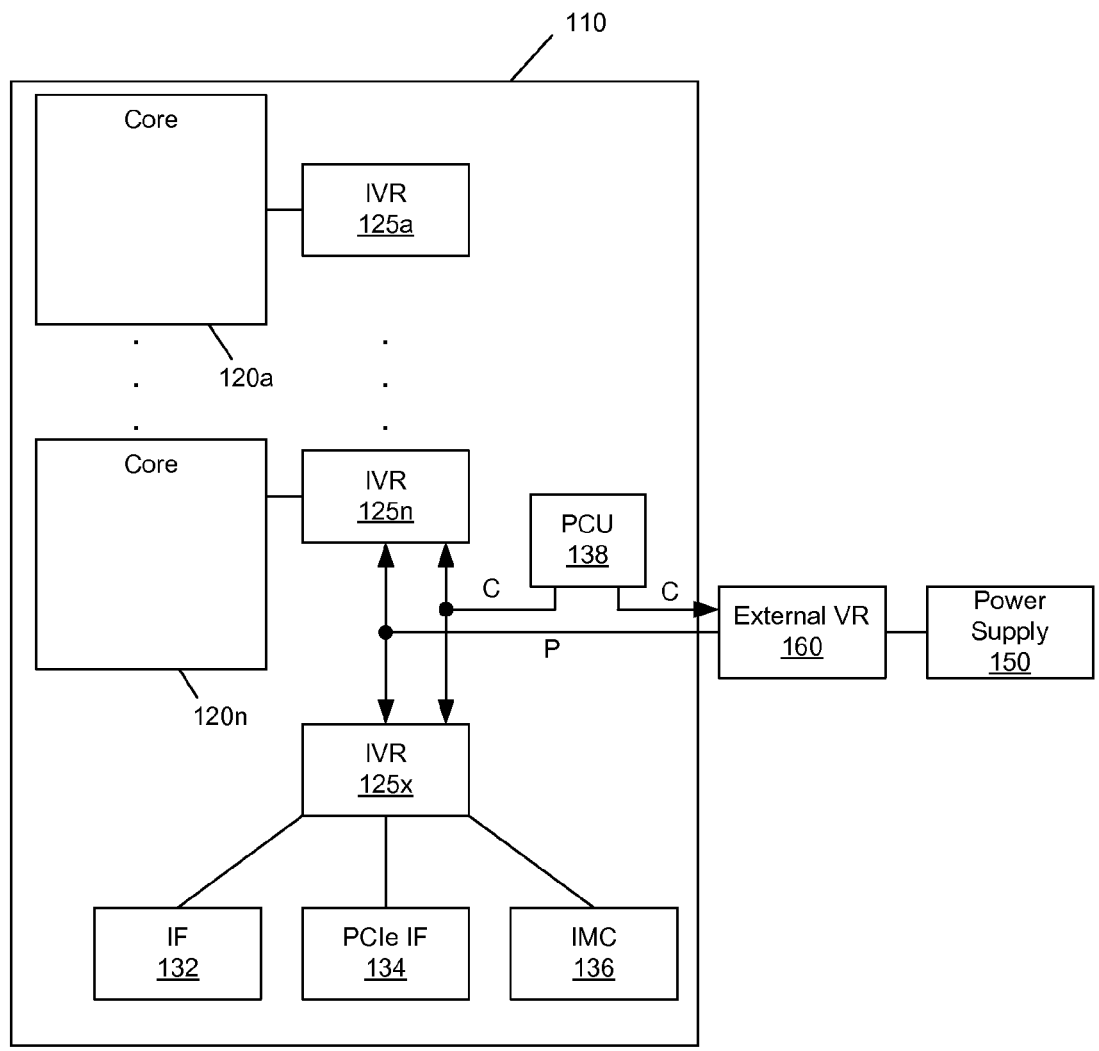
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to perform independent power management of individual lanes of vector execution units present in one or more of cores 120 and/or other processing logic of processor 110.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the lane-based vector unit performance monitoring and power control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
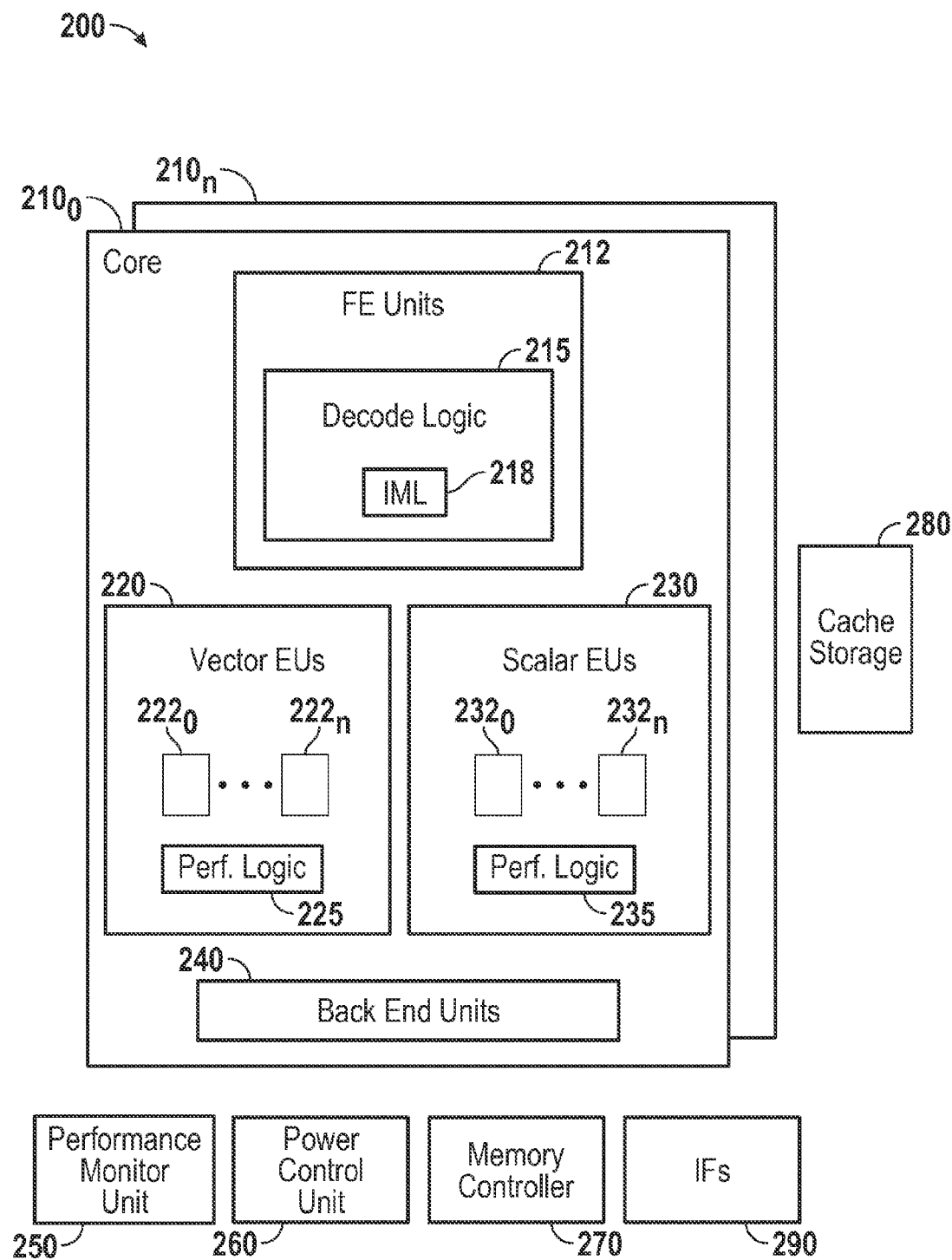
FIG. 2 is a block diagram of a processor in accordance with an embodiment.

Referring now to FIG. 2 shown is a block diagram of a processor 200 in accordance with an embodiment. As shown in FIG. 2, processor 200 may be a multicore processor including a plurality of cores $210_0$-$210_n$. Details of one such core $210_0$ are shown. Understand that in some embodiments the cores may be homogeneous cores, while in other embodiments one or more of the cores may be of a heterogeneous design, such as a mix of in-order and out-of-order cores, and/or general purpose processing cores and one or more special purpose processing cores such as a graphics processing unit.

In the embodiment shown, core $210_0$ includes front end units 212, execution units 220 and 230, and back end units 240. Details will be discussed below, but for purposes of introduction here, note that front end units 212 include a decode logic 215 that in turn may include an instruction modification logic 218. As will be discussed further herein, decode logic 215 may be configured to receive an incoming macro-instruction of a given ISA and decode the instruction into one or more micro-operations. In addition, using instruction modification logic 218, in certain cases a particular macro-instruction may be converted into or substituted with a different macro-instruction. For example, in embodiments described herein certain vector instructions, e.g., of a first vector width, may be converted to similar vector instructions, e.g., of a second vector width, to improve efficiency and/or power management.

Further shown in FIG. 2 are execution units 220 and 230. In the embodiment shown, one or more vector execution units 220 and one or more scalar execution units 230 are present. More particularly, a plurality of vector execution units $222_0$-$222_n$ are provided. Each vector execution unit may be of a particular width. For example, in an embodiment, a first vector execution unit $222_0$ may be configured for 4-wide vector operations, a second vector execution unit $222_1$ may be configured for 8-wide vector operations, and a third vector execution unit $222_n$ may be configured for 16-wide vector operations.

In an embodiment, the vector widths may be formed of individual independent lanes each to operate on a given data element where in an embodiment, each vector data element may be a 32-bit wide single precision floating point value. Of course other vector widths and data types are possible using vector execution units. In another embodiment, instead of independent vector execution units, a single vector execution unit may be provided of a maximum vector width, where for at least certain cases only some of the individual lanes of execution units may be enabled for certain instructions. Further, as will be described herein in any implementation of vector execution units, power management may be performed to dynamically and flexibly enable only certain vector execution widths, e.g., different numbers of vector lanes, thus reducing power consumption.

As further shown in FIG. 2, vector execution unit 220 further includes a performance logic 225, which may be configured to monitor performance of execution in one or more of the vector units and to provide this information to a performance monitor unit 250 of the processor. As further shown in FIG. 2, scalar execution units 230 may include a plurality of individual execution units $232_0$-$232_n$ (and understand that a performance logic 235 may also be associated with the scalar execution units).

Still referring to FIG. 2, in addition to a performance monitor unit 250, a power control unit 260 also may be present. Using an embodiment of the present invention, logic within power control unit 260 may be configured, based on information received, e.g., from performance monitor unit 250, to control power management of the various execution units, including vector execution units 220 and other processor components. As further shown, processor 200 includes additional components, including a memory controller 270, a cache storage 280, which may include one or more levels of a cache memory hierarchy, and one or more interfaces 290 to enable interfacing with various off-chip components of the system. Furthermore, understand that while shown with this particular implementation in the embodiment of FIG. 2, many variations and additional components may be present in other embodiments.

Figure 3:
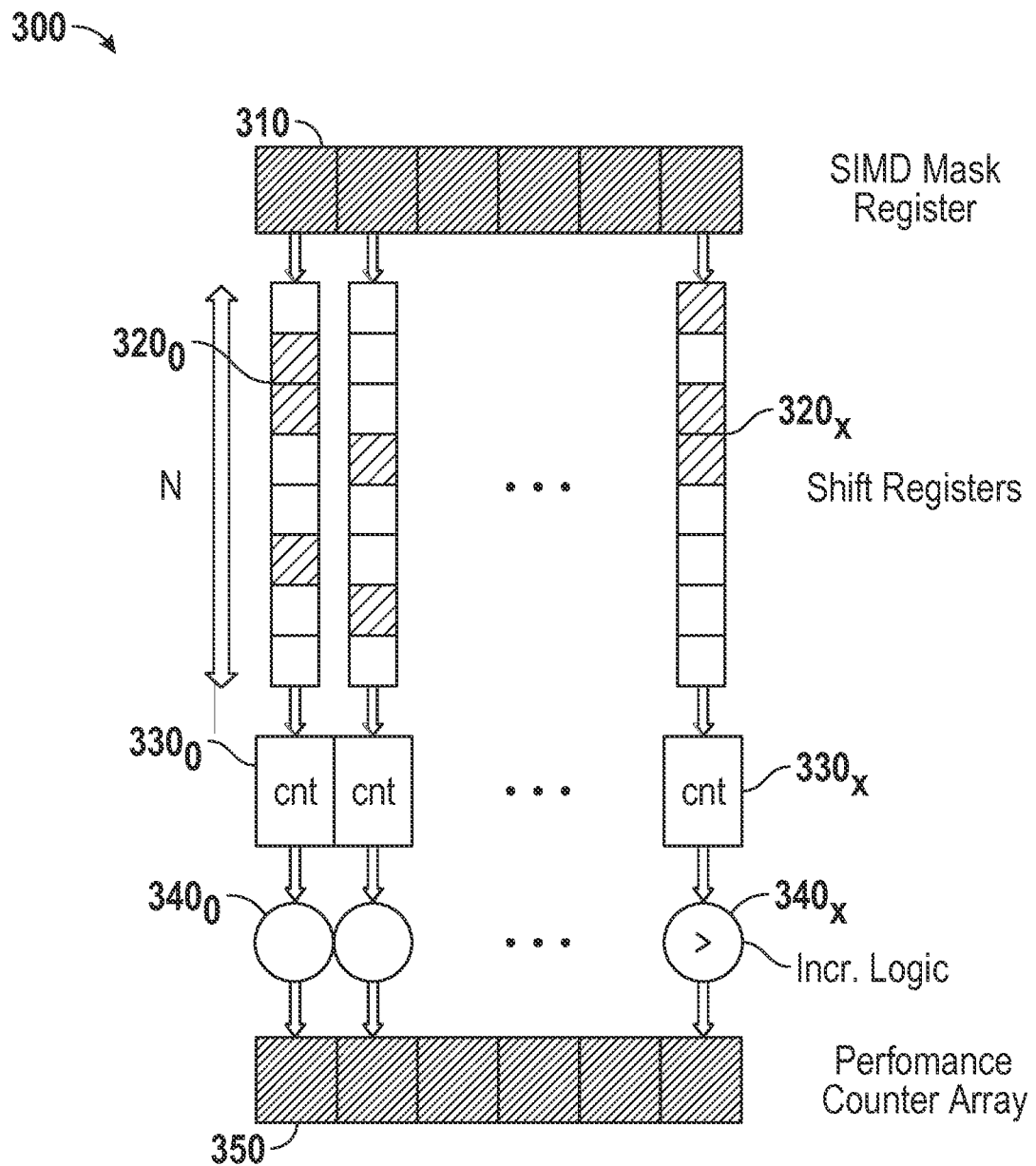
FIG. 3 is a block diagram of a performance monitoring unit for vector operations in accordance with an embodiment.

Referring now to FIG. 3, shown is a block diagram of a performance monitor unit for vector operations in accordance with an embodiment. As shown in FIG. 3, unit 300 may be all or a portion of a performance logic associated with one or more vector execution units of a processor. As seen, a plurality of shift registers $320_0$-$320_X$ are present, each of which is associated with a given data element of a mask register 310. In an embodiment mask register 310 provides information as to which data elements of a given vector execution unit are to be active or inactive, e.g., as controlled by a value set in the mask register. In an embodiment, a most significant bit of each data element of mask register 310 may be of a first logic value (e.g., logic high value) to indicate that the corresponding data element or lane is active and a second logic value (e.g., logic low value) to indicate the corresponding data element or lane is inactive.

In an embodiment, shift registers 320 may be configured with a plurality of bits N, such that for each cycle, a value is written into the low order bit of the register. This bit is then propagated, cycle-by-cycle, from the least significant bit to the most significant bit. To provide information from these shift registers, a plurality of counters $330_0$-$330_X$ may be provided, each associated with a given one of the shift registers. In an embodiment, each counter may maintain a count of the number of bits of the corresponding shift register of a particular logic value (e.g., logic high value). In turn, each counter 330 is coupled to an increment logic $340_0$-$340_X$. In an embodiment, each increment logic 340 is configured to determine when a count value in a corresponding counter 330 is greater than a threshold level. If so, a value stored in a corresponding performance counter of a performance counter array 350 associated with the given increment logic may be incremented (e.g., by one). Although shown with this high level in the embodiment of FIG. 3, understand that the scope of the present invention is not limited in this regard and many variations and alternatives are possible.

In the embodiment of FIG. 3, a history of the mask bits for each vector lane thus may be maintained by shift registers 320 (which may store the last N mask bits for each lane). The hardware monitor then computes a population count on the history of each lane (corresponding to the duty cycle of that lane), and compares that count value to a threshold (which in an embodiment may be a duty cycle threshold of 50%). This comparison result drives an increment signal for a performance counter of performance counter array 350 such that each individual counter of the array indicates how many cycles that the corresponding vector lane had a duty cycle greater than the duty cycle threshold.

While described with this particular implementation in FIG. 3 understand that there are other possible ways for hardware to track the vector lane utilization information. For example, a count of the number of active and inactive vector lanes may be maintained. Or a count of the number of masked vector instructions having, e.g., the upper half of the mask bits inactive may be maintained. Note that such instructions may be prime candidates for using a narrower vector width. As yet another example, a count may be maintained of the number of masked vector instructions for which a particular threshold (e.g., >=50%) of the lanes inactive, regardless of where they are located.

Note that the duty cycle information may be used for software optimization. There are several manners in which software can use the duty cycle information to make optimization decisions. In a particular embodiment, to utilize the duty cycle feedback information, for each piece of code (e.g., key loops or functions) that contains vector operations, a programmer or compiler generates different versions of the code that use different vector interfaces (e.g., one code segment using vector instructions of a first vector width (e.g., a widest available vector width, such as AVX-512 instructions), a narrowest vector width (e.g., SSE instructions) or a middle vector width (e.g., for AVX). In various embodiments, a programmer or compiler can then use branches or function pointers to point to the copy of code that uses the widest vector width (e.g., AVX-512). Additional instrumentation code segment injected at the end of each code sequence is configured to: (1) dynamically query the performance monitoring unit for duty cycle information; and (2) change the branch behavior or re-wire the function pointer as appropriate based at least in part on the duty cycle information. At runtime, once the piece of code executes, the injected instrumentation code segment uses the performance counter interface to query the duty cycle information and perform optimizations.

Figure 4A:
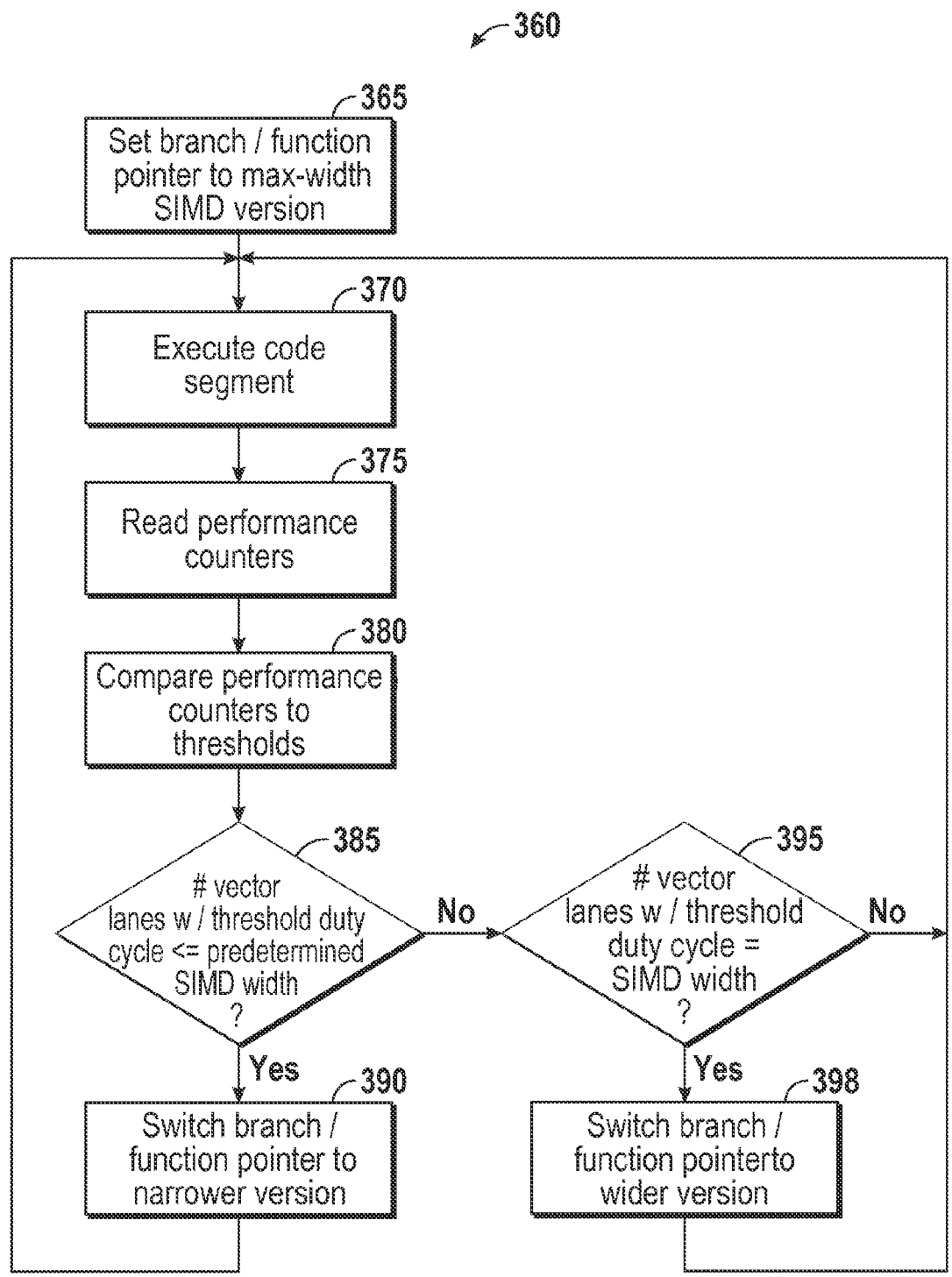
FIG. 4A is a flow diagram of a method in accordance with an embodiment of the present invention.

Referring now to FIG. 4A, shown is a flow diagram of a method in accordance with an embodiment of the present invention. As shown FIG. 4A, method 360 may be used to optimize code execution based on dynamic analysis of performance monitoring information regarding usage of various lanes of a vector execution unit as described herein. Accordingly, method 360 may be executed during operation of an application that includes vector instructions. Such application may include or may be compiled to include multiple code segments, each for a given vector execution width. For example, a first code segment may include vector instructions of a 4-wide width, a second code segment may include vector instructions of an 8-wide width, and a third code segment may include vector instructions of a 16-wide width. In addition to these code segments, the application may include or may be instrumented (e.g., via compilation) to include code described as in FIG. 4A to enable performance monitoring and analysis, and dynamic code segment selection based on the performance monitoring information.

As seen in FIG. 4A, method 360 begins by setting a branch/function pointer to a maximum vector width version of a code segment (block 365). In the example above, this maximum width version may correspond to a 16-wide vector execution, e.g., using AVX-512 instructions.

Next at block 370 the code segment is executed. As an example, a code segment may include both vector and scalar instructions, including instructions for manipulations on vector-width data. At a conclusion of this code segment, execution of instrumentation code may begin. As seen, control passes to block 375 where performance counters may be accessed and read. Specifically, a performance monitoring unit such as unit 300 may be accessed to determine the value of the different performance counters in performance counter array 350. Next at block 380, these performance counters may be compared to corresponding thresholds. In an embodiment, a single threshold may be used to compare against different performance counters, while in other embodiments multiple thresholds may be present, e.g., with the thresholds varying based on the associated performance counter (e.g. a counter associated with a more significant lane of a vector may have a lower threshold).

At diamond 385, it can be determined whether a number of vector lanes having a threshold (e.g., high) duty cycle is less than or equal to a given SIMD width. As one example, the SIMD width may be a half width of a maximum SIMD width (thus in this example, a threshold of 8). Understand while the scope of the present invention is not limited in this regard, a threshold duty cycle may correspond to a given duty cycle for which the corresponding vector lane is active (e.g., 50%, in an embodiment).

In one embodiment, the performance counter array provides a number of cycles that each vector lane's duty cycle exceeded a given threshold. These active cycle counts then may be divided by the total execution time of the code segment of interest to obtain a ratio. In turn, this ratio may be compared to a second threshold, and a population count may be taken on the output of the comparisons. Stated another way, the number of vector lanes that have a sufficiently high duty cycle may be determined. Although the scope of the present invention is not limited in this regard, this threshold duty cycle may be set to 50%. If this number of sufficiently active vector lanes is less than a threshold vector width (e.g., half of the widest possible vector width), then the software changes the branch behavior or function pointer to point to a version of the code with a narrower vector instruction (operand) width if available. On the other hand, if all available vector lanes have a sufficiently high duty cycle, then the software may change the branch behavior or function pointer to point to a version of the code with wider vector instructions/operands, if available.

Still with reference to FIG. 4A, if at diamond 385 it is determined that the number of vector lanes having a threshold duty cycle is less than or equal to this threshold width, control passes to block 390. There, execution may switch via a branch to a narrower version of the code segment (e.g., associated with an 8-wide instruction version or a 4-wide instruction version). Alternately, a function pointer may be set to point to this narrower version of the code. Control next passes back to block 370 discussed above.

Instead if at diamond 395, it is determined that the number of vector lanes with a threshold duty cycle is equal to the current vector execution unit width (of enabled lanes), control passes to block 398, where execution may switch via a branch to a wider version of the code segment (e.g., associated with an 8-wide instruction version or a 16-wide instruction version). Alternately, a function pointer may be set to point to this wider code version. Control next passes back to block 370 discussed above. Understand while described at this high level in the embodiment of FIG. 4A, variations are possible.

Note further that the same performance monitoring information may equally be used by hardware, e.g., to perform optimizations to reduce core power consumption. As one such example, vector lanes may be powered down speculatively. That is, based on the duty cycle information, hardware may speculatively power down some of the vector lanes. If it turns out that one or more of the vector lanes turned off is needed, those lanes could be turned back on, albeit with some delay.

Figure 4B:
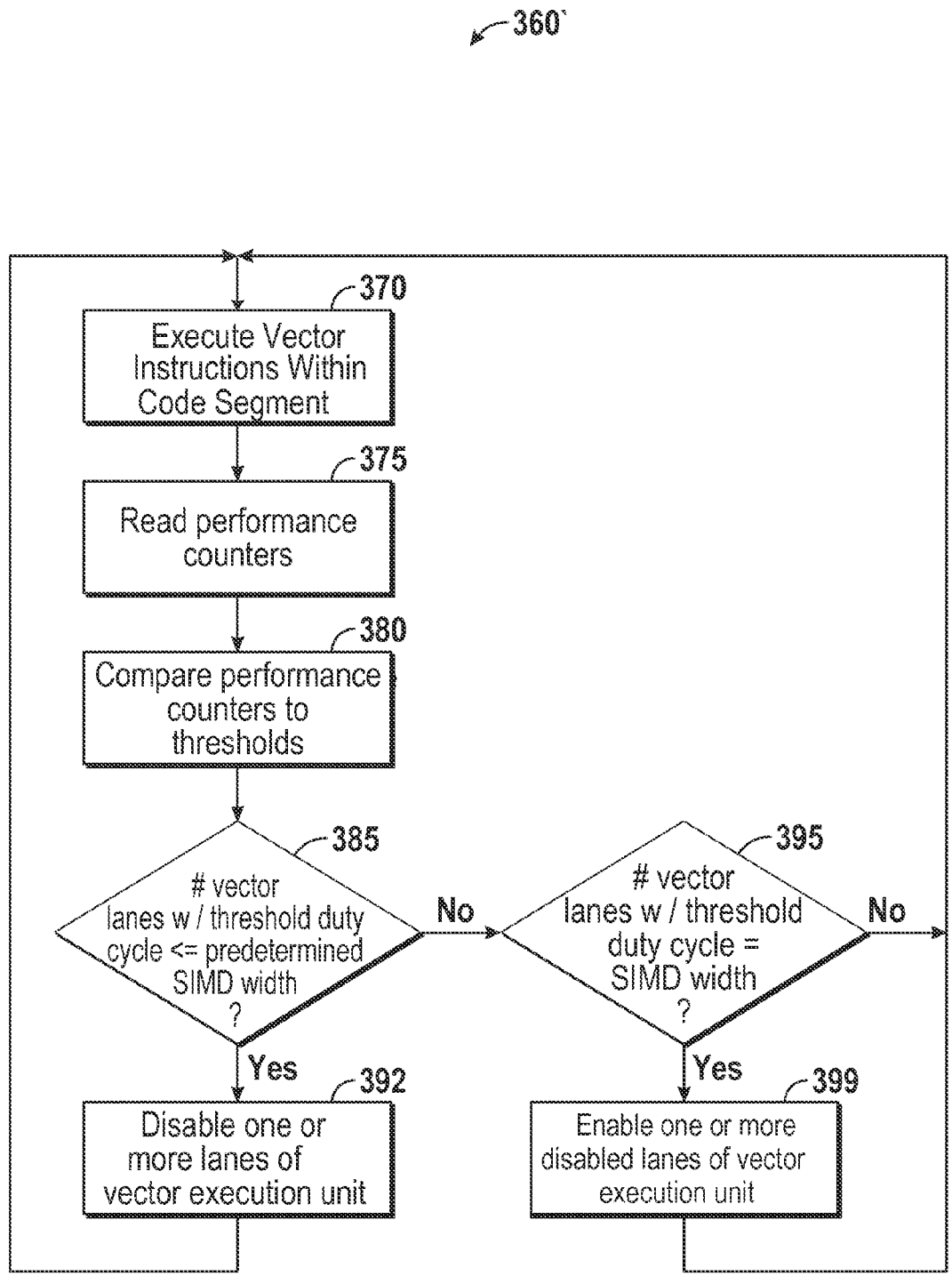
FIG. 4B is a flow diagram of a method in accordance with another embodiment of the present invention.

Referring now to FIG. 4B, shown is a flow diagram of a method in accordance with another embodiment of the present invention. As shown FIG. 4B, method 360' may be a variant of method 360 of FIG. 4A, where performance monitoring information is used by hardware (e.g., vector lane control logic) to dynamically and speculatively enable/disable certain vector lanes based on the performance monitoring information.

As seen in FIG. 4B, method 360' occurs during execution of a code segment (e.g., an application) including vector instructions (block 370). During such execution, at block 375 performance counters may be accessed and read, e.g., under hardware control. Next at block 380, these performance counters may be compared to corresponding thresholds.

At diamond 385, it can be determined whether a number of vector lanes having a threshold duty cycle is less than or equal to a given SIMD width. If so, control passes to block 392, where one or more lanes of the vector execution unit may be disabled dynamically and speculatively such that power consumption is reduced. Control next passes back to block 370 discussed above.

Instead if at diamond 395, it is determined that the number of vector lanes with a threshold duty cycle is equal to the current vector execution unit width (of enabled lanes), control passes to block 399, where one or more previously disabled lanes of the vector execution unit may be enabled to improve efficiency (e.g., by enabling execution of wider vector width instructions). Control next passes back to block 370 discussed above. Understand while described at this high level in the embodiment of FIG. 4B, many variations are possible.

As another example, hardware may perform dynamic instruction demotion. In such cases, if the vector lane duty cycle information indicates that certain vector lanes (e.g., the bottom vector lanes such as those closest to the LSB) are mostly used, hardware may substitute the execution of wide vector instructions with narrower vector instructions (e.g., use SSE instructions to operate on AVX-512 registers). If hardware detects that the higher order vector lanes are to be accessed later, it could roll back the operation and execute the instructions without demotion. To effect such operation, in some embodiments code may provide flags or other demarcation of regions of code that are amenable for dynamic demotion.

As such, embodiments may leverage performance monitoring information including vector lane duty cycle information to optimize vector operations. In this way, applications may more efficiently utilize existing vector interfaces. The same information can be used to reduce power consumption on hardware.

Figure 5:
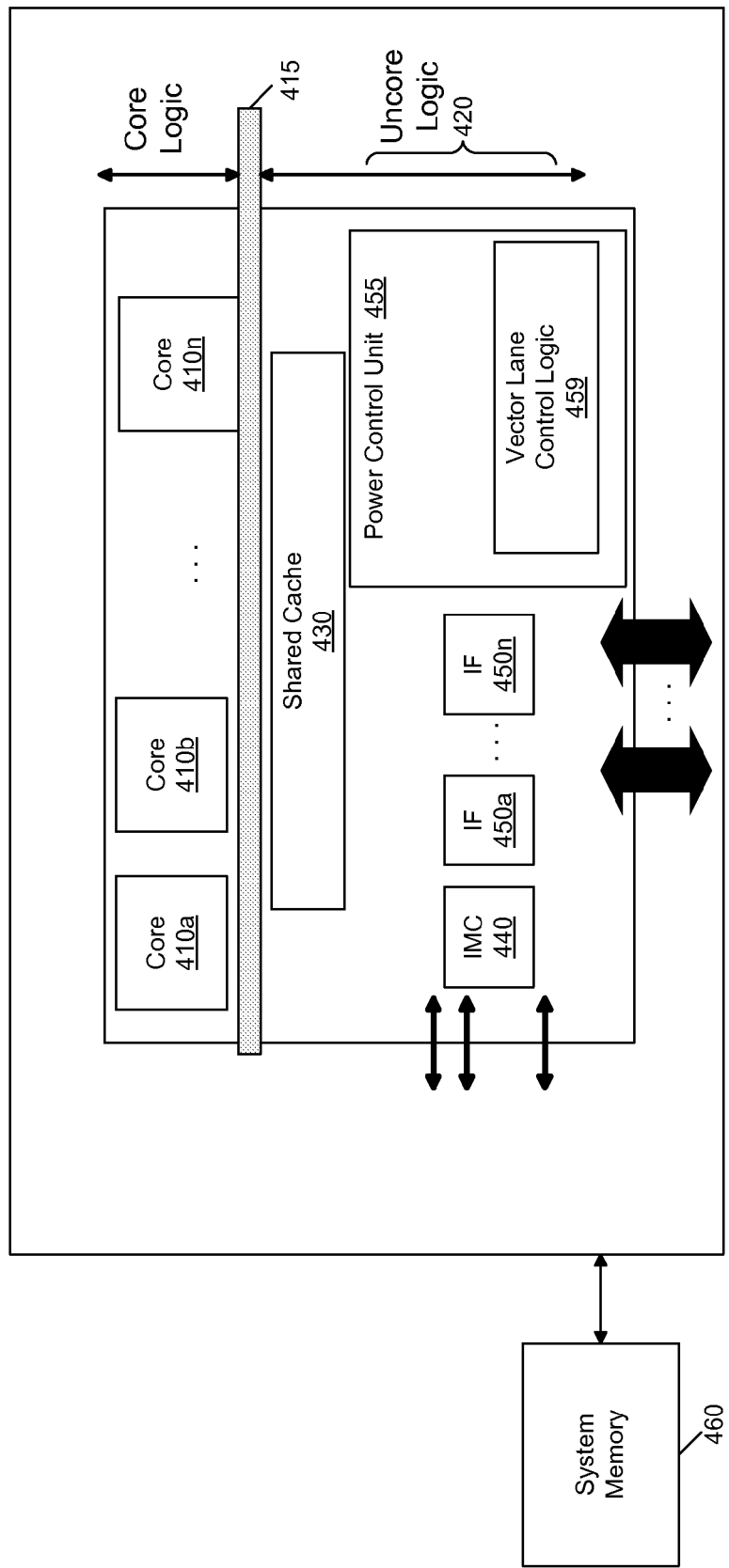
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a vector lane control logic 459 in accordance with an embodiment of the present invention. Using this logic, performance monitoring information received regarding usage of individual lanes of one or more vector units can be leveraged to dynamically enable and disable different mixes of the lanes based on their utilization. And, based on further feedback information this dynamic mix of enabled and disabled lanes (namely powered up and powered down lanes) may dynamically change during execution of a single application or may change as different workloads are performed on the processor.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
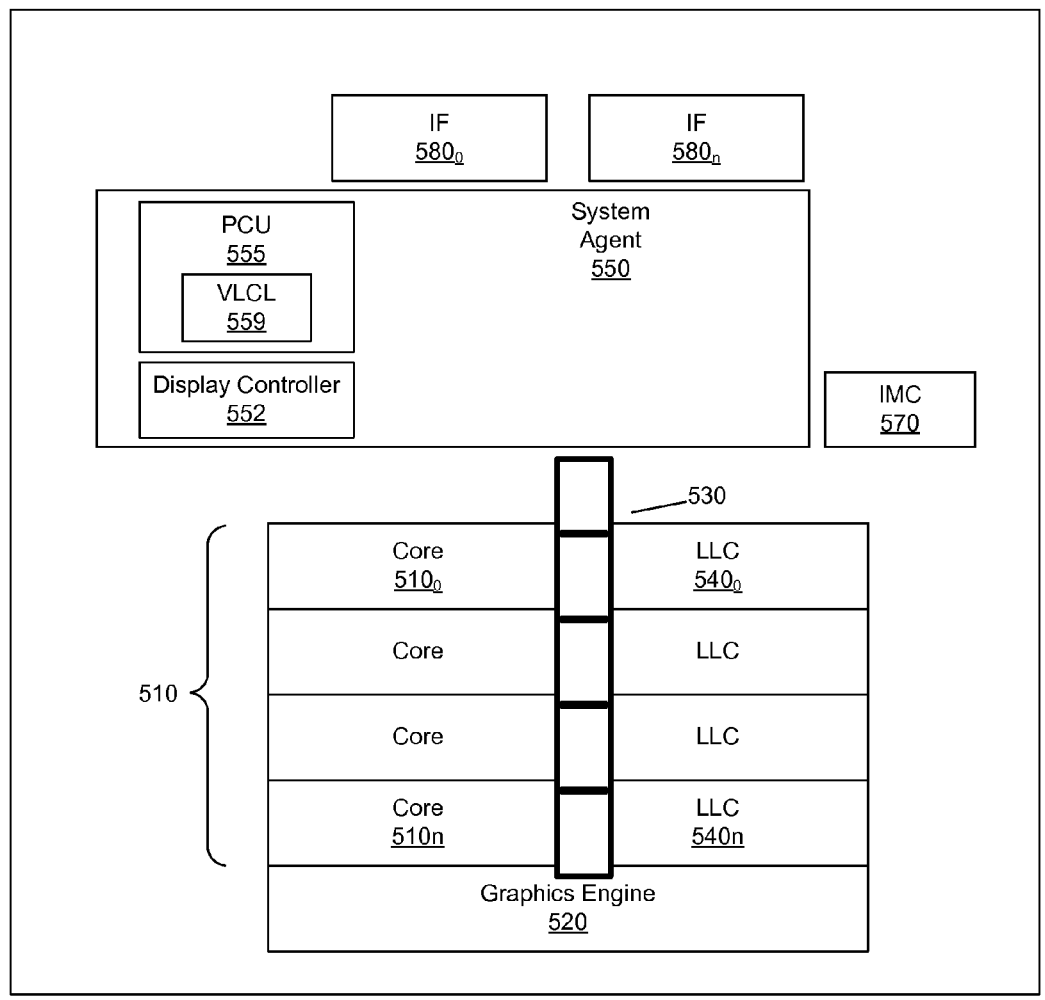
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a vector lane control logic 559 in accordance with an embodiment of the present invention to dynamically control the power state of vector lanes independently. In various embodiments, this logic may perform this power control responsive to performance monitoring information.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
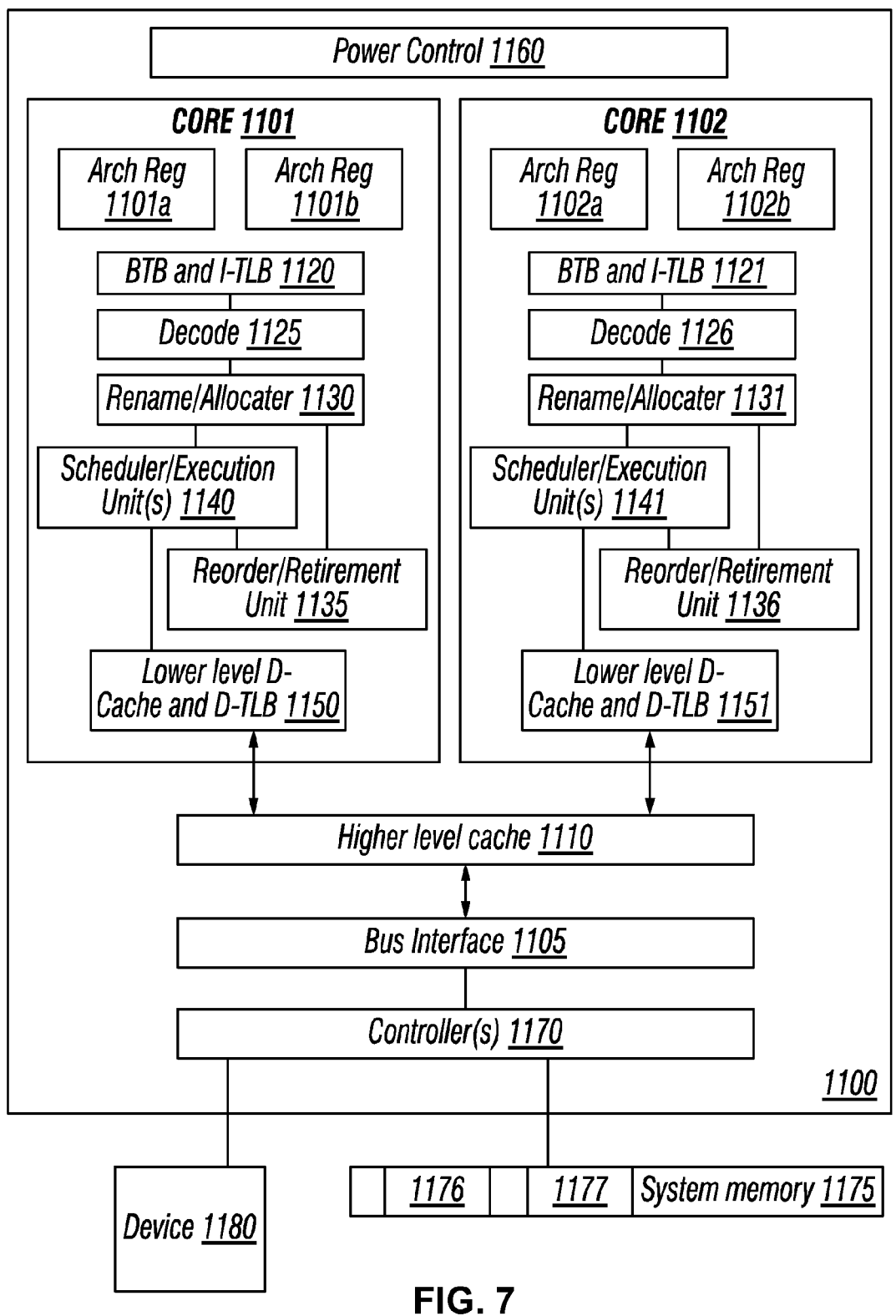
FIG. 7 is a block diagram of an embodiment of a processor.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core.

However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices.

Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
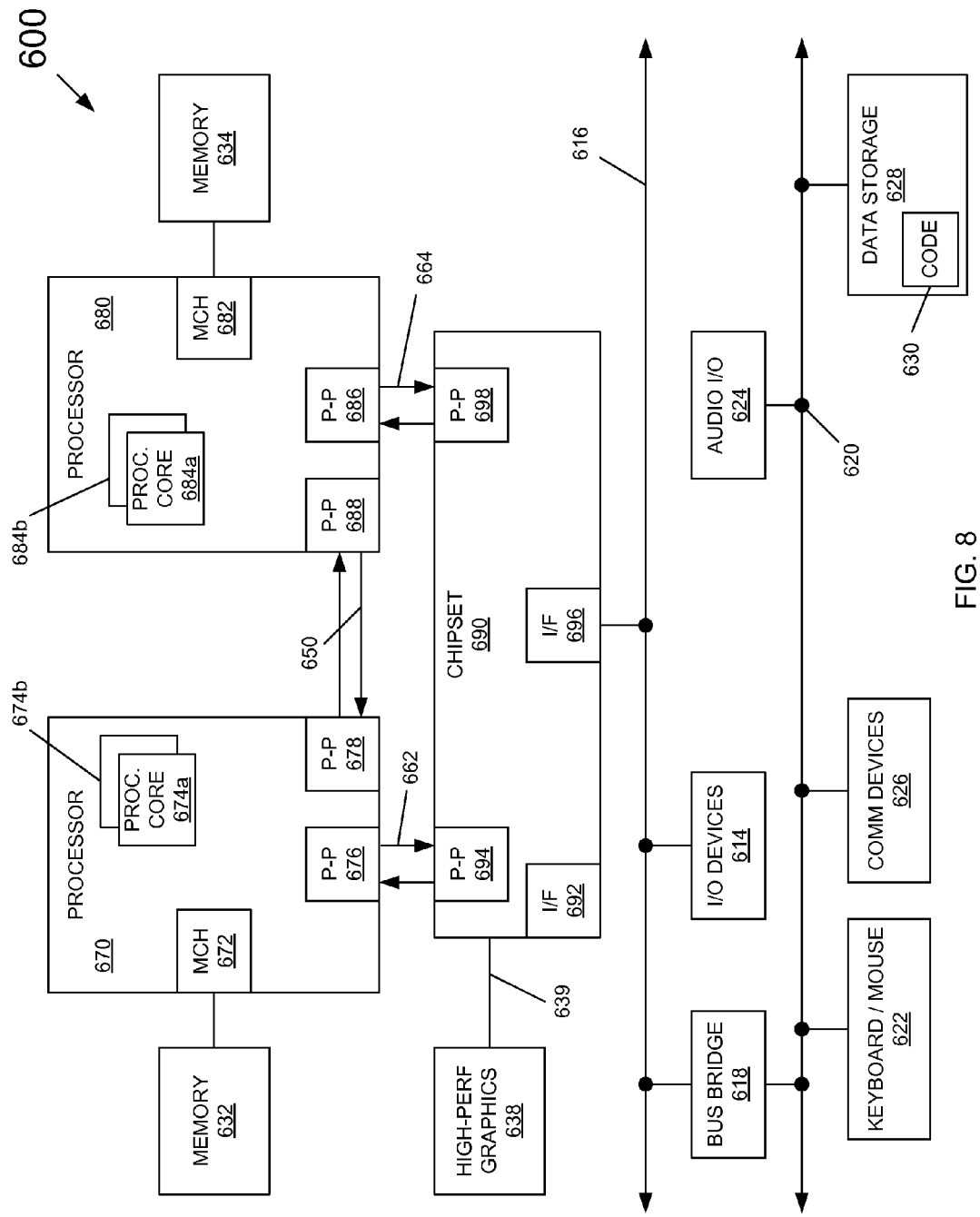
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674*a* and 674*b* and processor cores 684*a* and 684*b*), although potentially many more cores may be present in the processors. Each of the processors can include a PCU or other logic to independently control power consumption of individual lanes of vector execution units, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
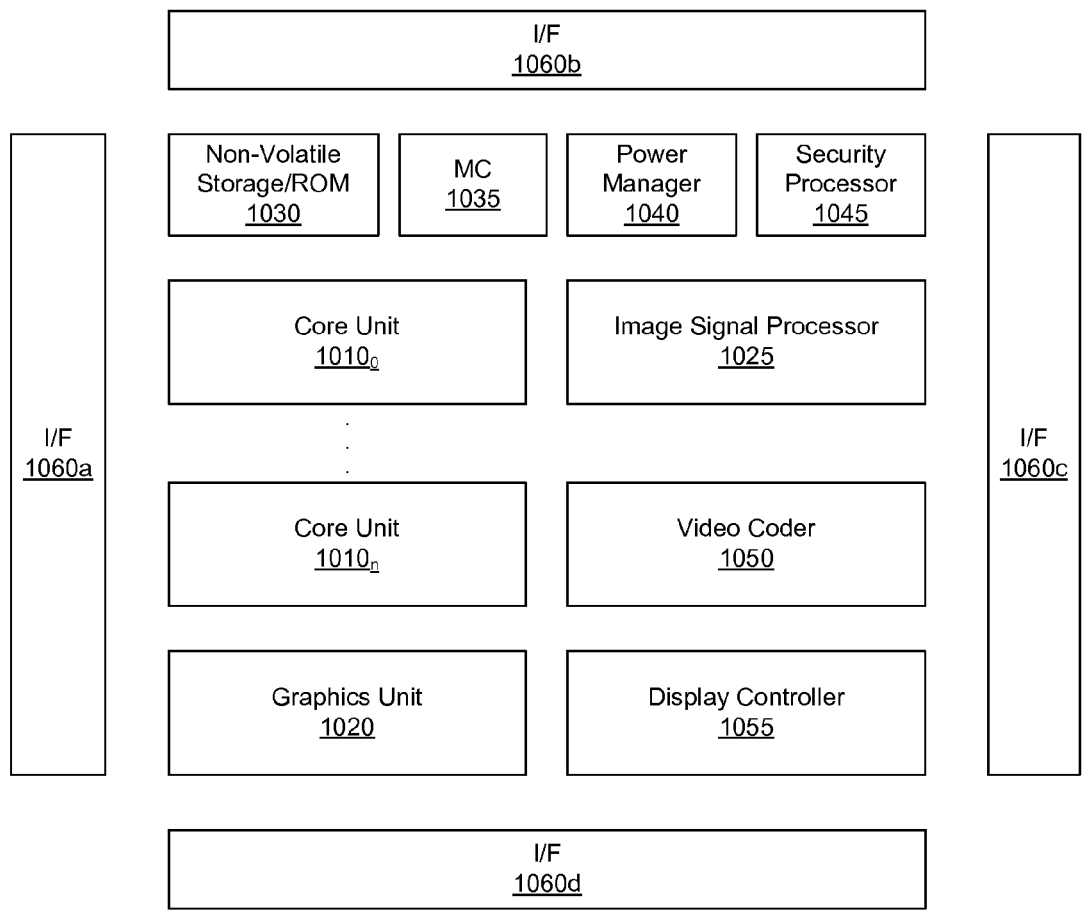
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform power management for the various units of processor 1000. For example, core units 1010, graphics unit 1020, image signal processor 1025 and video coder 1050 each may include one or more vector execution units internally. Such units, formed of independent lanes, may be power controlled on a lane-by-lane basis by power manager 1040, e.g., based on performance monitoring information received regarding utilization of the individual lanes, as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™, GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

Figure 10:
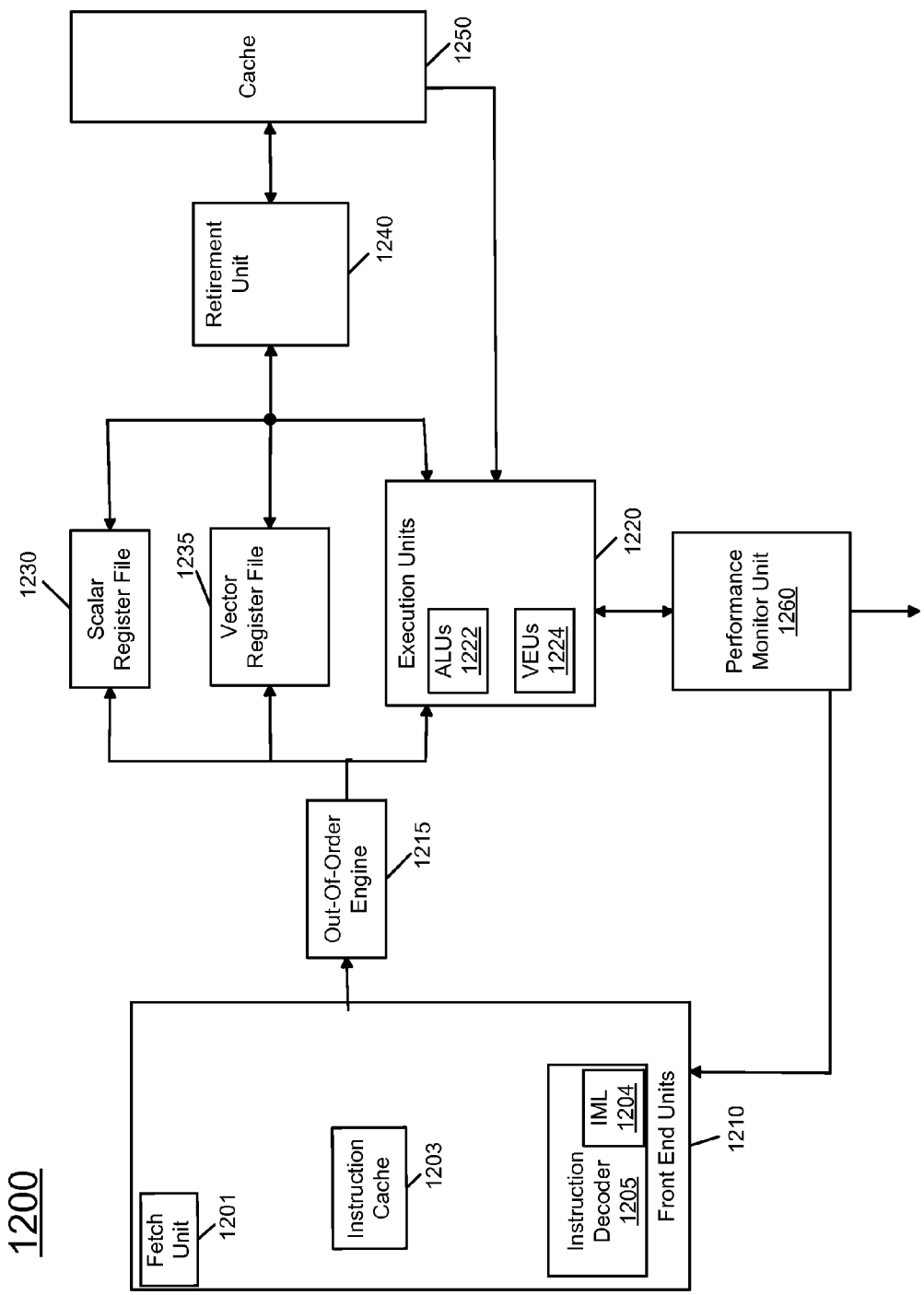
FIG. 10 is a block diagram of a processor core in accordance with one embodiment of the present invention.

Referring now to FIG. 10, shown is a block diagram of a processor core in accordance with one embodiment of the present invention. As shown in FIG. 10, processor core 1200 may be a multi-stage pipelined out-of-order processor. Core 1200 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including core 1200 may be a general-purpose processor, such as a Core™ i3, i5, i7, 2 Duo and Quad, Xeon™, Itanium™, XScale™ or StrongARM™ processor, which are available from Intel Corporation. Alternatively, the processor may be from another company, such as a design from ARM Holdings, Ltd, MIPS, etc. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

As seen in FIG. 10, core 1200 includes front end units 1210, which may be used to fetch instructions to be executed and prepare them for use later in the processor. For example, front end units 1210 may include a fetch unit 1201, an instruction cache 1203, and an instruction decoder 1205. In some implementations, front end units 1210 may further include a trace cache, along with microcode storage as well as a micro-operation storage. Fetch unit 1201 may fetch macro-instructions, e.g., from memory or instruction cache 1203, and feed them to instruction decoder 1205 to decode them into primitives, i.e., micro-operations for execution by the processor. In the embodiment shown in FIG. 10, instruction decoder 1205 includes an instruction modification logic 1204 which may be configured, e.g., responsive to performance information received from a performance monitor unit 1260, to dynamically substitute vector instructions of different widths, based on utilization. Thus as described above, incoming AVX-512 vector instructions may be modified or substituted with smaller width instructions such as AVX vector instructions or SSE vector instructions, as examples. After such substitution, instruction decoder 1205 may then decode these substituted macro-instructions into micro-operations for execution in the vector units of the processor.

Coupled between front end units 1210 and execution units 1220 is an out-of-order (OOO) engine 1215 that may be used to receive the micro-instructions and prepare them for execution. More specifically OOO engine 1215 may include various buffers to re-order micro-instruction flow and allocate various resources needed for execution, as well as to provide renaming of logical registers onto storage locations within various register files such as scalar register file 1230 and vector register file 1235. Register file 1230 may include separate register files for integer and floating point operations. Vector register file 1235 may provide storage for vector-sized units, e.g., 256 or 512 bits per register.

Various resources may be present in execution units 1220, including, for example, various integer, floating point, and single instruction multiple data (SIMD) logic units, among other specialized hardware. For example, such execution units may include one or more arithmetic logic units (ALUs) 1222. In addition, the execution units may include one or more vector execution units 1224 configured into multiple lanes, where each of the lanes can be individually and dynamically power controlled, e.g., based on performance monitoring information regarding their utilization.

Note also that performance monitor unit 1260 further communicates performance monitoring information such as lane-based utilization information to off-core components such as a power management unit that can be configured to dynamically control power delivery to the individual lanes of one or more of vector execution units 1224, as described herein.

Results from the execution units may be provided to a retirement unit 1240 including a reorder buffer (ROB). This ROB may include various arrays and logic to receive information associated with instructions that are executed. This information is then examined by retirement unit 1240 to determine whether the instructions can be validly retired and result data committed to the architectural state of the processor, or whether one or more exceptions occurred that prevent a proper retirement of the instructions. Of course, retirement unit 1240 may handle other operations associated with retirement.

As shown in FIG. 10, retirement unit 1240 is coupled to a cache 1250 which in one embodiment may be a low level cache (e.g., an L1 cache), although the scope of the present invention is not limited in this regard. Also, execution units 1220 can be directly coupled to cache 1250. From cache 1250, data communication may occur with higher level caches, system memory and so forth. While shown with this high level in the embodiment of FIG. 10, understand the scope of the present invention is not limited in this regard. For example, while the implementation of FIG. 10 is with regard to an out-of-order machine such as of a ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

The following examples pertain to further embodiments.

In one example, a processor comprises: a vector execution unit including a plurality of lanes to execute operations on vector operands; a performance monitor coupled to the vector execution unit to maintain information regarding an activity level of the plurality of lanes; and a control logic coupled to the performance monitor, where the control logic is to control power consumption of the vector execution unit based at least in part on the activity level of at least some of the plurality of lanes.

In an example, the processor further includes a mask register coupled to the vector execution unit to store a mask value, where the mask value is to control which lanes are to be active during execution of an operation in the vector execution unit. The performance monitor may maintain the information regarding the activity level based at least in part on the mask value. The control logic may provide the activity level of each of the plurality of lanes to an application that is to execute on the vector execution unit, in an embodiment. The application may include a plurality of code segments each to operate on a different number of lanes of the vector execution unit, and where the application is to select a first code segment of the plurality of code segments to execute based on the activity level. The code segments may include the first code segment having one or more first vector instructions to operate on vector operands of a first width and a second code segment having one or more second vector instructions to operate on vector operands of a second width, the second width greater than the first width. During execution of the first code segment, at least one of the plurality of lanes may be powered down.

In an example, the performance monitor comprises: a plurality of shift registers each associated with a lane of the vector execution unit, each shift register to set a bit of the shift register to a first state when the associated lane is active during a cycle; and a plurality of counters each associated with one of the shift registers and to maintain a count of the first state bits present in the corresponding shift register.

In one example, the performance monitor further comprises: an increment logic coupled to the plurality of counters; and a performance counter array including a plurality of performance counters each associated with a corresponding one of the plurality of counters, where the increment logic is to update a count value of a corresponding performance counter when the first state bit count is greater than a threshold value.

In an example, the control logic is to power down at least one of the plurality of lanes based on the count value of the corresponding performance counter. The control logic may receive a feedback signal if a powered down lane is to be used by an instruction, and to cause the powered down lane to be powered up, in an example.

In an example, the processor further comprises a decode logic to receive a first vector instruction for a first vector width operation and substitute the first vector instruction with a second vector instruction for a second vector width operation, where the second vector width less than the first vector width, based at least in part on the activity level.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a method comprises: executing, on a vector execution unit having a plurality of lanes, a first code segment including one or more first vector instructions; maintaining a count of lanes of the vector execution unit active during the first code segment execution; determining, based on the maintained count of lanes, whether a number of the plurality of lanes having a duty cycle greater than a threshold duty cycle is less than a threshold vector width; and if so, causing a different code segment including one or more second vector instructions to execute. The one or more second vector instructions may be of a narrower width than the one or more first vector instructions of the first code segment.

In an example, the method further includes: initializing code execution with the first code segment, where the one or more first vector instructions are of a widest available vector width; and downgrading to the different code segment if the number of the lanes having the duty cycle greater than the threshold duty cycle is less than the threshold vector width, the one or more second vector instructions having a width less than the widest available vector width.

In an example, the method further includes: setting a bit of a shift register associated with a lane of the plurality of lanes to a first state when the lane is active during a cycle; and updating a performance counter associated with the shift register when a number of set bits of the shift register exceeds a threshold.

In an example, the method further includes powering down at least one of the plurality of lanes during execution of the different code segment. Also, the method may include generating the different code segment during compilation of an application including the first code segment, in an example.

In another example, a computer readable medium including instructions is to perform the method of any of the above examples.

In another example, an apparatus comprises means for performing the method of any one of the above examples.

In a still further example, a system comprises a processor including: a decode logic to receive instructions of one or more ISAs and to decode each of the instructions into one or more micro-operations, the decode logic including an instruction modification logic to substitute a second vector instruction of a second ISA for a received first vector instruction of a first ISA; a vector execution unit coupled to the decode logic and including a plurality of lanes to execute operations on vector operands responsive to vector instructions; a performance monitor logic coupled to the vector execution unit to maintain count information for each of the plurality of lanes regarding activity of the corresponding lane and to determine a value for each of the plurality of lanes based on the count information; and power control means coupled to the performance monitor logic for receiving the value for each of the plurality of lanes and for controlling power consumption of at least one of the plurality of lanes based on the value for the corresponding lane. In addition, the system may further include a dynamic random access memory coupled to the processor.

In an example, the power control means is to place at least one lane into a low power state during operation of the vector execution unit based on the value of the corresponding lane. The power control means may place a first set of the lanes into the low power state when the instruction modification logic is to perform the instruction substitution. The instruction modification logic may perform the instruction substitution responsive to an instruction modification enable signal, in an example. The power control means may receive a feedback signal if a powered down lane is to be used by a vector instruction of the first ISA, and to cause the powered down lane to be powered up.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a vector execution unit including a plurality of lanes to execute operations on vector operands;
    a performance monitor coupled to the vector execution unit to maintain information regarding an activity level of each of the plurality of lanes, the performance monitor to maintain a count of the plurality of lanes active during execution of a first code segment; and
    a control logic coupled to the performance monitor, wherein the control logic is to determine, based on the maintained count of the plurality of lanes, whether a number of the plurality of lanes having a duty cycle greater than a threshold duty cycle is less than a threshold vector width, and disable a first subset of the plurality of lanes while a second subset of the plurality of lanes are to be active to control power consumption of the vector execution unit based at least in part on the activity level of at least some of the plurality of lanes.

2. The processor of claim 1, wherein the control logic is to provide the activity level of each of the plurality of lanes to an application that is to execute on the vector execution unit.

3. The processor of claim 2, wherein the application includes a plurality of code segments each to operate on a different number of lanes of the vector execution unit, and wherein the application is to select a first code segment of the plurality of code segments to execute based on the activity level.

4. The processor of claim 1, wherein the performance monitor comprises:
    a plurality of shift registers each associated with a lane of the vector execution unit, each shift register to set a bit of the shift register to a first state when the associated lane is active during a cycle; and
    a plurality of counters each associated with one of the shift registers and to maintain a count of the first state bits present in the corresponding shift register.

5. The processor of claim 4, wherein the performance monitor further comprises:
    an increment logic coupled to the plurality of counters; and
    a performance counter array including a plurality of performance counters each associated with a corresponding one of the plurality of counters, wherein the increment logic is to update a count value of a corresponding performance counter when the first state bit count is greater than a threshold value.

6. The processor of claim 5, wherein the control logic is to power down at least one of the plurality of lanes based on the count value of the corresponding performance counter.

7. The processor of claim 6, wherein the control logic is to receive a feedback signal if a powered down lane is to be used by an instruction, and to cause the powered down lane to be powered up.

8. A non-transitory machine-readable medium having stored thereon instructions, which if performed by a machine cause the machine to perform a method comprising:
    executing, on a vector execution unit having a plurality of lanes, a first code segment including one or more first vector instructions;
    maintaining a count of lanes of the vector execution unit active during the first code segment execution;
    determining, based on the maintained count of lanes, whether a number of the plurality of lanes having a duty cycle greater than a threshold duty cycle is less than a threshold vector width; and
    if so, causing a different code segment including one or more second vector instructions to execute, the one or more second vector instructions of a narrower width than the one or more first vector instructions of the first code segment.

9. The non-transitory machine-readable medium of claim 8, wherein the method further comprises:
    setting a bit of a shift register associated with a lane of the plurality of lanes to a first state when the lane is active during a cycle; and
    updating a performance counter associated with the shift register when a number of set bits of the shift register exceeds a threshold.

10. The processor of claim 1, wherein the control logic is, responsive to the number of the plurality of lanes being less than the threshold vector width, to cause a different code segment including one or more second vector instructions to execute, the one or more second vector instructions of a narrower width than the one or more first vector instructions of the first code segment.

11. A method comprising:
    executing, on a vector execution unit having a plurality of lanes, a first code segment including one or more first vector instructions;
    maintaining a count of lanes of the vector execution unit active during the first code segment execution;
    determining, based on the maintained count of lanes, whether a number of the plurality of lanes having a duty cycle greater than a threshold duty cycle is less than a threshold vector width; and if so, causing a different code segment including one or more second vector instructions to execute, the one or more second vector instructions of a narrower width than the one or more first vector instructions of the first code segment.

12. The method of claim 11, further comprising:

setting a bit of a shift register associated with a lane of the plurality of lanes to a first state when the lane is active during a cycle; and updating a performance counter associated with the shift register when a number of set bits of the shift register exceeds a threshold.

\* \* \* \* \*